United States Patent [19]
Powell et al.

[11] 3,771,352
[45] Nov. 13, 1973

[54] TEST APPARATUS AND METHOD
[75] Inventors: Donald L. Powell, Chicago; Roy J. Pustelnik, Tinley Park, both of Ill.
[73] Assignee: Autoresearch Laboratories Incorporated, Chicago, Ill.
[22] Filed: Jan. 12, 1972
[21] Appl. No.: 217,144

[52] U.S. Cl. .......................................... 73/54, 73/64
[51] Int. Cl. ..................... G01n 11/06, G01n 33/30
[58] Field of Search ..................... 73/54, 55, 56, 64

[56] References Cited
UNITED STATES PATENTS
1,804,210  5/1931  Cross et al. .......................... 73/64 X
2,175,638  10/1939  Rau ..................................... 73/64 X
2,486,080  10/1949  Turner et al. ........................... 73/64

FOREIGN PATENTS OR APPLICATIONS
122,635  8/1958  U.S.S.R. .................................. 73/54
200,307  7/1967  U.S.S.R. .................................. 73/56

Primary Examiner—S. Clement Swisher
Assistant Examiner—Joseph W. Roskos
Attorney—Hume, Clement et al.

[57] ABSTRACT

An apparatus and method of evaluating the fluidity of lubricating oils picks up oil from a sump by a rotating gear and deposits portions of the same on an inclined channel. The oil flows down the inclined channel and returns to the sump through a restricted aperture. The time for the oil to be deposited upon the channel, the time for the oil to flow down the channel, and the time for the oil to flow through the restricted aperture and return to the sump are observed.

11 Claims, 3 Drawing Figures

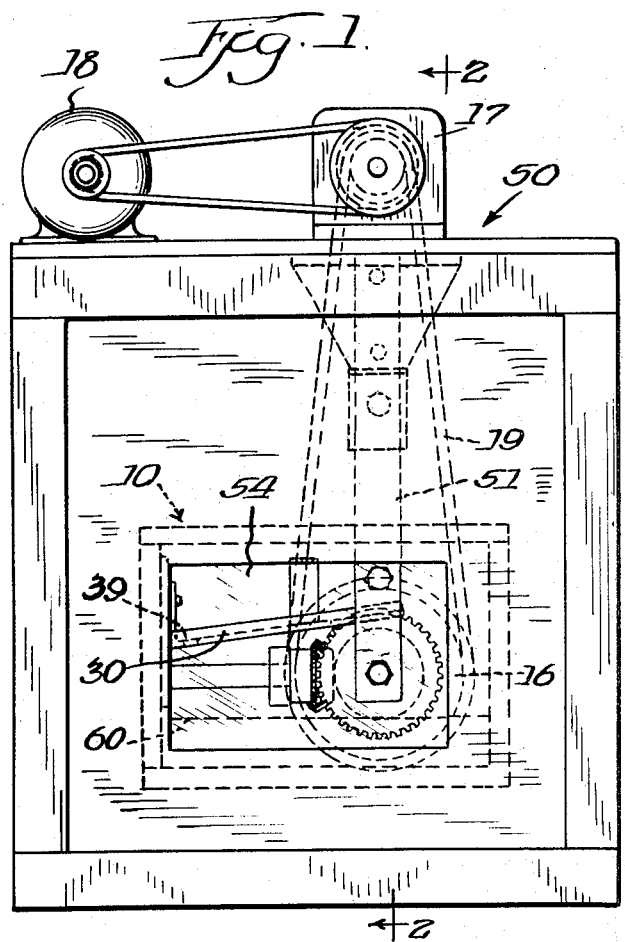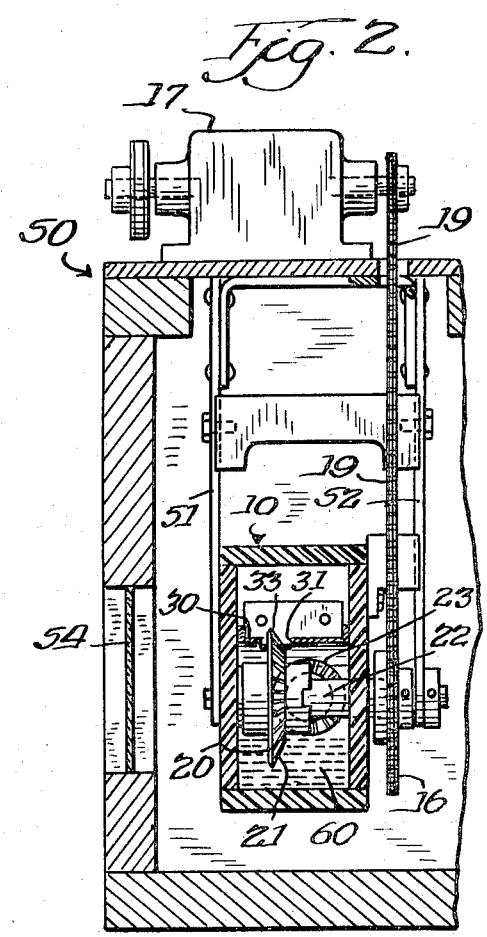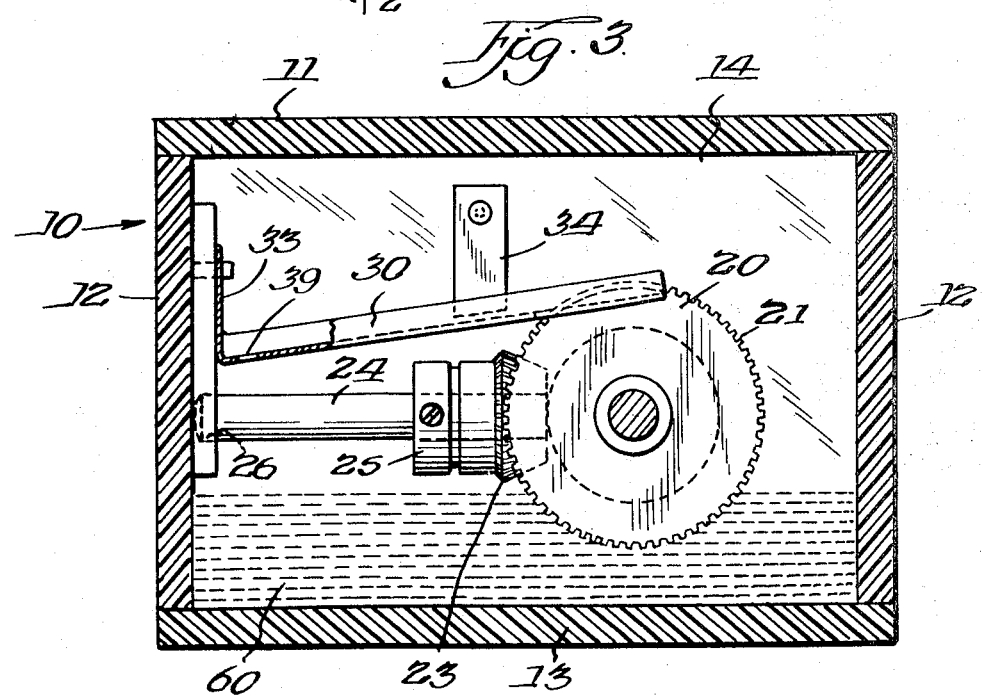

TEST APPARATUS AND METHOD

FIELD OF THE INVENTION

This invention relates to an apparatus and method for measuring fluidity of lubricating compositions, and more particularly, to an apparatus and method for measuring the fluidity of lubricating oils for use in axles, for example, as found in automobiles, trucks and the like.

BACKGROUND OF THE INVENTION

The tests recognized heretofore for measuring fluidity of axle lubricating oils have been the Kinematic Viscosity test, Brookfield Viscosity test, Pour Point test, and the Channel Point test. The Kinematic Viscosity test measures the time for the oil composition to flow between two points in a glass tube. The Brookfield Viscosity test measures the resistance to turning of a rod immersed in an oil composition. The Pour Point test determines the temperature below which the oil composition does not pour or flow. The Channel Point test determines the temperature below which the lubricating oil fills a channel formed by moving a paddle across the bottom of a vessel.

None of the foregoing tests correlate the fluidity to the use of the lubricating oil in the axle of an automobile or truck. Moreover, each of the foregoing tests does not evaluate all of the performance requirements of a lubricating oil for an axle.

SUMMARY OF THE INVENTION

It is therefore an object of the invention to provide an improved apparatus or process for measuring the fluidity of lubricating compositions.

It is another object of the invention to provide a test for measuring the fluidity of lubricating compositions that takes into account the factors not determined by prior recognized tests.

It is another object of the invention to provide fluidity tests for determining suitability of lubricating compositions for use in axles of automobiles, trucks, and the like.

It is another object of the invention to provide a test which is simple in construction and operation, economically performed, and yet sufficiently reliable to provide for optimum correlation to axle field service conditions.

Other and further objects of the invention will be apparent as the description proceeds.

BRIEF DESCRIPTION OF THE DRAWINGS

FIG. 1 is a side elevational view of a test apparatus embodying the invention;

FIG. 2 is a sectional view taken through lines 2—2 of FIG. 1;

FIG. 3 is an enlarged view of a portion of the test apparatus.

DESCRIPTION OF THE PREFERRED EMBODIMENT

Referring now to the drawings, the test apparatus is contained in a clear plastic box 10, for example, Lexan, a polycarbonate material sold by General Electric, so that the operation is readily visible to the observer. The box has a removable top wall 11, end walls 12, side walls 14, and a bottom wall 13. A gear 20 is mounted for rotation above the bottom wall 13 on shaft 22. Gear teeth 21 on the gear 20 engage and drive a pinion 23. Pinion 23 is secured to shaft 24 mounted on bearings 25, 26. As best shown in FIG. 2, the shaft 22 is journalled in the rear sidewall 14 and extends exteriorly of the box 10. Pulley 16 is driven by electric motor 18 through gear reducer 17, and chain drive 19 to rotate the gear 20.

A channel 30 has one end juxtaposed adjacent the gear 20 and the other end extending downwardly at an angle offset from horizontal by 7.5°. A plurality, for example, three, spaced apertures 39 may be formed in the lower end of the inclined channel. The apertures 39 each have a diameter of 7/32 inches. The channel 30 has overall length of 6½ inches and is cut away at 31 (see FIG. 2) to accommodate the upper rotating portion of the gear 20. The channel is secured by brackets 33 and 34 to the end and sidewalls of the box 10.

Referring now to FIGS. 1 and 2, the test apparatus may be mounted in a cold chamber 50 provided with a suitable refrigerating system (not shown) for reducing the temperature to a desired point. The test box 10 is suspended in the cold chamber by suitable brackets 51, 52. A window 54 is provided in the side wall of a cold chamber for observing the tests conducted in the test box 10.

The operation of the testing apparatus will now be described. The test box 10 is filled with the lubricating composition to be tested to a level of 1½ inches depth on the bottom wall as indicated at 60. The box is then placed in the cold chamber and the temperature lowered to the desired point. The electric motor 18 is energized so that the gear 20 rotates it at a preselected speed. Oil is picked up from the oil sump at the bottom of the box 10 by the ring gear 20 and deposited on the channel 30. The oil after deposition on channel 30 moves down the inclined surface of channel 30 and then returns to the sump through apertures 39. The operator observes and records the time for the lubricating oil to: (1) be carried by the gear to the channel (2) flow down the inclined channel to the aperture 39, and (3) start flowing through the aperture 39 back to the sump 19. The operator also observes whether the oil continuously flows to the ring gear from the bath, or if a channel is formed in the bath by the rotating gear to prevent continuous flow to the gear.

The foregoing observations are repeated at various desired temperature points, in order to determine suitability of the lubricating composition for use within a projected temperature range.

The foregoing example test procedure is given to further illustrate the invention.

EXAMPLE

ASSEMBLY OF APPARATUS

Assemble the test apparatus as shown in FIG. 1.
Prepare the test box 10 as follows:

a. Remove the top cover 11 of the box and thoroughly clean all internal parts of the assembly with dry-cleaning solvent. Then wash with toluene and allow to air dry.

b. Lubricant chain 19 with graphite.

c. Fill box with test lubricant to depth of 1½ inches taking care to pour some test lubricant over gear 20 and pinion 23.

d. Replace and fasten lid 11.

e. Install test box 10 in cold chamber 50, adjust chain drive, speed reducer and motor.

f. Bring temperature of cold box 50 to selected operating temperature and maintain for 16 hours.

OPERATION OF TEST a. Leaving the test box 10 in the low temperature box 50, flow small amount of alcohol over chain 19 to remove any frost buildup.

b. Rotate the chain drive sprocket by hand sufficiently to rotate the ring gear 20 for one revolution.

c. Start the drive motor 18 and quickly bring gear speed to 76 rpm. Start stop watch or timer as soon as motor is started.

d. Observe and record time for oil to:
1. Be carried to top channel (the time for the first indication of oil to appear on channel 30);
2. Flow down channel to holes;
3. Start to flow through holes back to sump.

Also observe whether the oil continuously flows to the ring gear in the bath.

e. After 60 seconds of operation, increase ring gear speed to 260 rpm and observe whether lubricant continues to flow evenly through apparatus for 3 minutes.

f. Stop motor and conclude tests.

The invention contemplates evaluation of various types of lubricating compositions for use in axles including the conventional lubricating oils derived from hydrocarbons, and the synthetic compositions.

It is one of the discoveries of the invention that any lubricating composition for use in an axle requires several characteristics that have not been evaluated in the test procedures employed heretofore. These necessary properties or characteristics of lubricating composition for use in the axle are included as a function of the observations set forth in the foregoing test apparatus and method, so that the test results correlate closely with the performance of full scale axle equipment under service conditions.

Other modes of applying the principles of the invention may be employed, change being made as regards the details described, provided the features stated in any of the following claims or the equivalent of such be employed.

We claim:

1. A method for determining the fluidity of lubricating composition, and which is adapted to determine suitability of lubricating oils for use with axles, the steps comprising:

forming a bath of lubricating composition to be tested, rotating a gear member having a lower portion thereof immersed in said bath so that some of the lubricating composition is carried by the rotating gear above the oil bath level, collecting at least a portion of the lubricating composition carried by the rotating gear above the oil bath well on an inclined channel, returning the lubricating composition collected on said channel to said bath through at least one restricted opening, and determining the time of movement of the lubricating composition between at least two points in the foregoing described path above the oil bath well.

2. The method of claim 1 which includes the step of measuring the time for the lubricating composition to be carried by the rotating gear to the inclined channel.

3. The method of claim 1 which includes the step of measuring the time for the lubricating composition to flow down the inclined channel to said restricted opening.

4. The method of claim 1 which includes the step of measuring the time for the lubricating composition to flow through said restricted opening and return to said bath.

5. The method of claim 1 which further includes lowering the temperature of the bath to a preselected point.

6. In a method for determining the fluidity of lubricating composition, and which is adapted to determine the suitability of lubricating compositions for use with axles, the steps comprising:

forming a bath of lubricating composition to be tested, adjusting the temperature of the bath to a predetermined degree, rotating a gear member having a lower portion immersed in said bath of lubricating composition so that some of the lubricating oil is carried above the bath level, collecting at least a portion of the lubricating composition carried by the rotating gear above the bath level on a platform, and determining the time of movement of said lubricating oil compositions from said oil well bath to said platform.

7. The method of claim 6 which further includes the steps of measuring the time for the lubricating composition to be carried by the rotating gear above the bath level to said platform.

8. In a method for determining the fluidity of lubricating compositions, and which is adapted to determine the suitability of lubricating compositions for use with axles, the steps comprising, forming a bath of lubricating oil to be tested, adjusting the temperature of the bath to a predetermined degree, depositing the composition from said bath upon an inclined channel, and determining the time for the lubricating composition to flow the longitudinal extent of said inclined channel.

9. The method of claim 8 which further included the step of flowing the lubricating composition through a restricted orifice, and determining the time for the lubricating composition to flow through said restricted orifice.

10. An apparatus for determining the fluidity of lubricating compositions, and which is adapted to determine the suitability of lubricating compositions for use with axles, the combination comprising:

sump means for containing the lubricating composition to be tested, gear means partially contained in said sump means and mounted for rotation, means for rotating said gear means in order that some of the lubricating composition in said sump means is carried therewith out of said sump means, inclined channel means for collecting the lubricating composition carried by said rotating gear means, and means including a restricted orifice for returning the lubricating composition from said inclined channel to said sump means.

11. The apparatus of claim 10 in which said restricted orifice is located on said inclined channel a point spaced from said rotating gear means.

* * * * *